Figure 1:
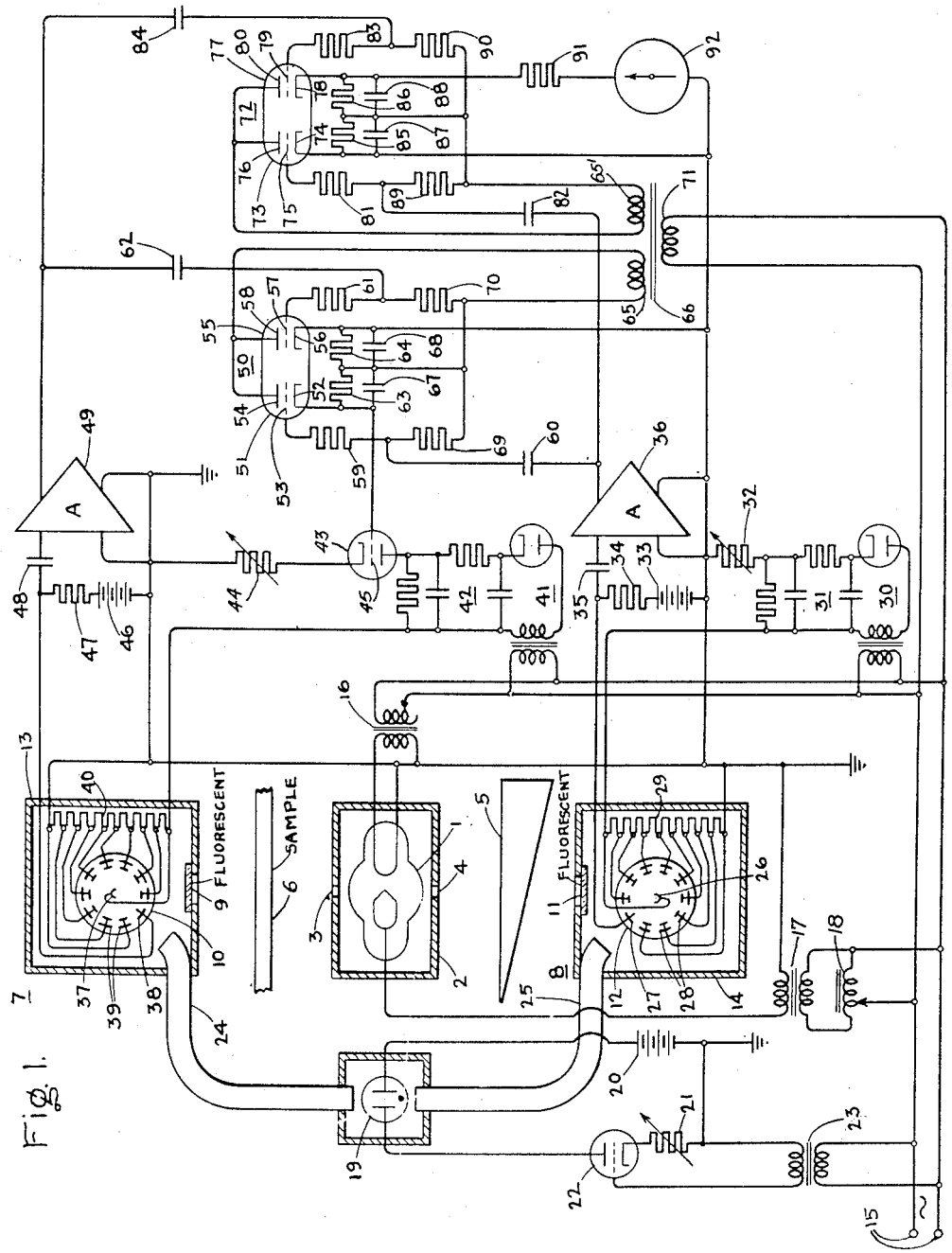

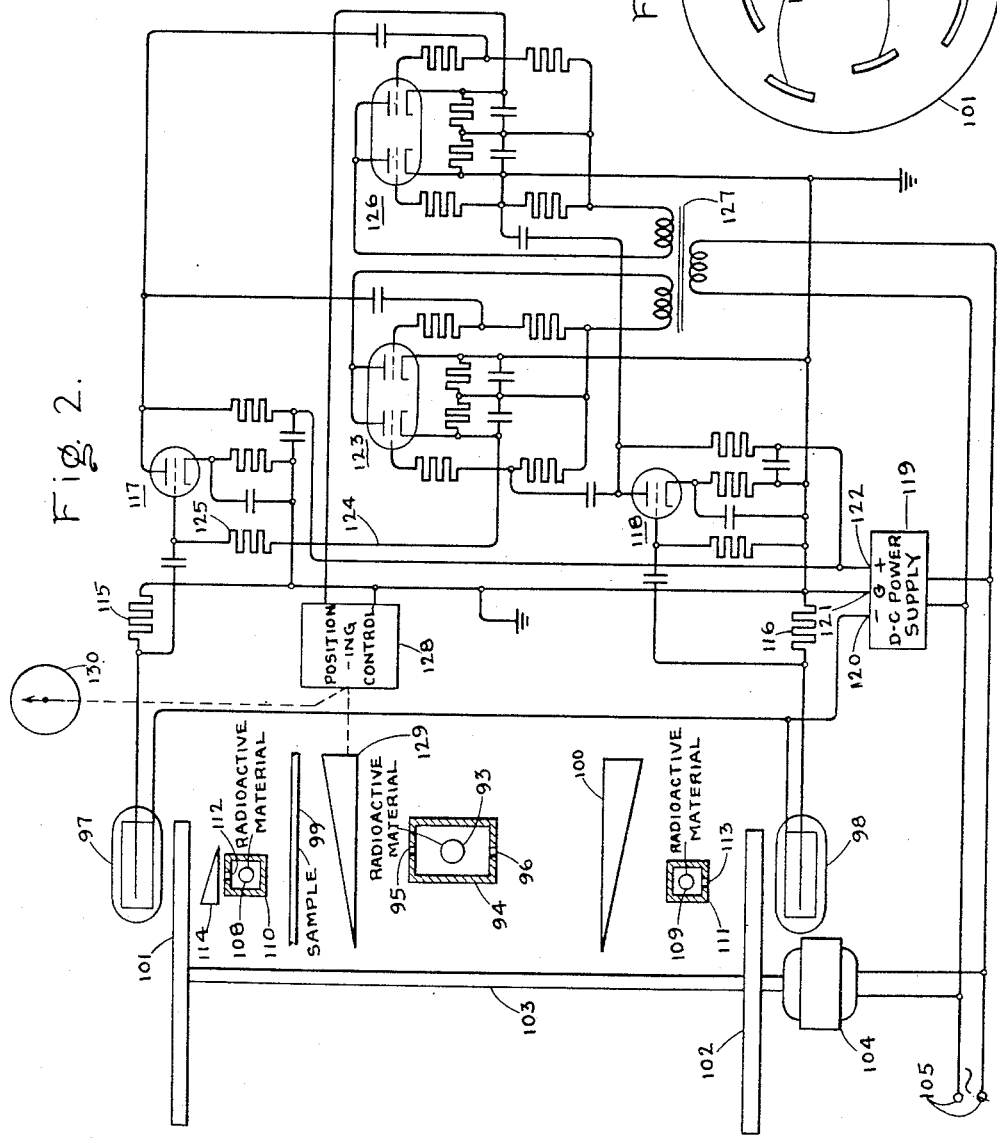

Patented Jan. 23, 1951

2,539,203

UNITED STATES PATENT OFFICE 2,539,203

NONCONTACTING THICKNESS GAUGE

Raymond V. Pohl, Schenectady, N. Y., assignor to General Electric Company, a corporation of New York Application February 17, 1950, Serial No. 144,704

7 Claims. (Cl. 250—71)

1

This invention relates to improved non-contacting gauges of the type in which two beams of penetrating radiations, such as X-rays, gamma rays or beta rays, are directed through a standard and through a sample to be examined respectively, each of which absorbs a portion of the radiation and transmits the remainder, and measurements are made of any difference between the amounts of radiation so transmitted, to compare the thickness or other characteristic of the sample and the standard.

In gauges of this type, it is preferable that the two beams of penetrating radiations be supplied by a common source, to provide two beams which are substantially identical in intensity and penetrating power. Since the two beams must follow two different paths, two radiation detectors are generally necessary—one to receive the unabsorbed radiation from each beam after it passes through the sample or the standard. The relative sensitivities of these two detectors must be very stable if the instrument is to maintain its calibration for any appreciable length of time. In general, sensitive radiation-responsive detectors and circuits require frequent recalibration when a high degree of accuracy must be maintained.

An object of this invention is to provide gauges of the type described having improved means for automatically maintaining equal sensitivities of the two detectors, so that accurate calibration of the gauge is maintained in a reliable and relatively simple manner. Other objects and advantages will appear as the description proceeds.

The features of this invention which are believed to be novel and patentable are pointed out in claims which form a part of this specification. For a better understanding of the invention, reference is made in the following description to the accompanying drawings, in which Fig. 1 is a schematic diagram of preferred apparatus embodying principles of the invention; Fig. 2 is a schematic diagram of other apparatus embodying principles of the invention; and Fig. 3 is a plan view of a shutter disk used in the Fig. 2 apparatus.

Referring now to Fig. 1, a two-beam X-ray tube 1, which may be enclosed in a shield 2 having ports 3 and 4 through which the two beams may pass, provides beams of penetrating radiations which pass through a standard 5 of known thickness and through a sample 6, the thickness of which is to be measured, respectively. Since these two beams are provided by the same X-ray

2 tube, their intensities and penetrating powers are practically identical. Sample 6 may be, for example, steel strip which moves past the gauge and is continually monitored as to its thickness. Standard 5 can be a piece of the sample material having a known standard thickness; or it may be a wedge, as shown, built into and forming a part of the gauge. The wedge, which has a varying thickness along its length, is adjustable in position so that a part of the wedge having the desired thickness may be positioned in the beam of X-rays.

A first radiation detector 7 is positioned to receive the unabsorbed X-rays from one of the beams after it passes through sample 6. A second radiation detector 8 is positioned to receive the unabsorbed X-rays from the other beam after it passes through standard 5. Detector 7 comprises a fluorescent element 9 positioned to receive the unabsorbed radiations which pass through sample 6. When such radiations strike the fluorescent element, it emits light. A phototube 10, preferably of the multiplier type as shown, is positioned to receive the light so emitted by fluorescent element 9. If desired, the flourescent element may be coated directly on the glass envelope of the phototube. Similarly, radiation detector 8 comprises a fluorescent element 11 positioned to receive unabsorbed radiations which pass through standard 5, and a phototube 12, preferably of the multiplier type, which is positioned to receive light emitted by element 11. Each of the detectors may be enclosed in a light-tight case, as shown at 13 and 14.

As illustrated at the lower left-hand corner of Fig. 1, terminals 15 are provided for connection to a suitable source of alternating electric power, such as a 60-cycle commercial outlet. A transformer 16 has its primary winding connected to terminals 15 and its secondary winding connected to the filament of X-ray tube 1, to supply the necessary filament current to operate the X-ray tube. Means for adjusting this filament current to a correct value for best operation of tube 1 may be provided, for example, by an adjustable tap on the primary winding of transformer 16, as shown.

A high-voltage transformer 17 has its primary winding connected to terminals 15 through an autotransformer 18, and its secondary winding connected between the secondary winding of transformer 16 and the anode of X-ray tube 1. This applies alternating voltage between the filament and anode of tube 1. Means for adjusting the amplitude of this voltage may be provided, for example, by an adjustable tap on autotransformer 18, as shown. Since the X-ray tube acts as a rectifying device and conducts current only when its anode is positive with respect to its filament, tube 1 is operative during positive half cycles only of the alternating voltage supplied to it, and the X-rays are produced as periodic pulses. Thus, use of an alternating current circuit provides means for periodically interrupting the X-ray beams.

Means for producing other or calibration radiations is provided, for example, by an electric discharge lamp 19, which may be a small neon glow lamp. Lamp 19 is preferably energized from a source of direct voltage, such as battery 20, through a resistor 21 and vacuum tube 22. Alternating voltage from terminals 15 is applied to the control electrode of tube 22 through a transformer 23. Tube 22 conducts only during positive half-cycles of this alternating voltage, and, therefore, current flows through lamp 19 in periodic pulses. These pulses of current are applied to lamp 19 during the half cycles when X-ray tube 1 is not operative so that the pulses of light produced by lamp 19 occur in time between the pulses of X-rays produced by tube 1.

Light-conducting tubes 24 and 25, which may be of Lucite or similar material, or equivalent systems of lenses or mirrors, are provided to transmit the pulses of light produced by lamp 19 to each of the two phototubes 10 and 12. Although it is preferable to use a single lamp 19 as illustrated, to insure that the pulses of light transmitted to phototubes 10 and 12 are equal in intensity, in cases where the use of light-conducting tubes is not convenient, separate electric discharge lamps may be provided for each phototube. When two such lamps are used, they are preferably operated from the same current source, or from regulated sources which supply equal currents, so that the pulses of light produced by the two lamps are of substantially equal intensity.

Phototube 12 comprises a photosensitive cathode 26, an anode 27, and a plurality of dynodes 28. Anode 27 and dynodes 28 are connected in conventional manner to a voltage divider 29, across which negative direct voltage is provided by a voltage supply comprising a conventional rectifier circuit 30 and a filter 31. The positive side of this voltage supply is connected to ground through a variable resistor 32. Adjustment of resistor 32 adjusts the value of voltage across voltage divider 29 and thus adjusts the sensitivity of phototube 12. Anode 27 is connected to a source of positive direct voltage, such as battery 33, through a load resistor 34. Pulses of light which strike photocathode 26 cause voltage pulses across resistor 34 which are transmitted through a capacitor 35 to an amplifier 36.

Similarly, phototube 10 comprises a photosensitive cathode 37, an anode 38, and a plurality of dynodes 39. Cathode 37 and dynodes 39 are connected in conventional manner to a voltage divider 40, across which negative direct voltage is provided by a conventional voltage supply comprising rectifier circuit 41 and filter 42. The positive side of voltage supply 41—42 is connected to ground through a vacuum tube 43, preferably a triode, and a resistor 44 in series. Tube 43 has a control electrode 45. The effective resistance of tube 43, and hence the value of direct voltage across voltage divider 40, depends upon the potential of electrode 45. With this arrangement, relatively small changes in the potential at electrode 45 produce large changes in sensitivity of phototube 10. The potential of electrode 45 is controlled as hereinafter described to adjust automatically the sensitivity of phototube 10, to maintain the sensitivities of the two radiation-responsive circuits in substantial equality. Anode 38 is connected to a source of positive direct voltage, such as battery 46, through a resistor 47. Pulses of light which strike cathode 37 cause pulses of voltage across resistor 47 which are transmitted through capacitor 48 to an amplifier 49.

Since X-ray tube 1 and lamp 19 are energized by alternate half-cycles of the alternating voltage supplied to terminals 15, tube 1 and lamp 19 operate alternately. Each operation of tube 1 causes X-ray pulses to strike fluorescent elements 9 and 11, which send pulses of light to phototubes 10 and 12, respectively. Each operation of lamp 19 sends pulses of light to the phototubes through tubes 24 and 25. Each pulse of light causes voltage pulses across resistors 34 and 47 which are amplified by amplifiers 36 and 49 respectively, to provide signal voltages which are related in magnitude to the pulses of light received by the phototubes. Thus, each of these signal voltages is a periodic series of voltage pulses, alternate ones of which are related in magnitude to the pulses of unabsorbed X-rays received by the fluorescent elements of the radiation detectors, and other alternate ones of which are related in magnitude to the calibration pulses of light received by the phototubes from lamp 19.

A first phase-selective comparison circuit 50 comprises a vacuum tube section 51 having a cathode 52, a control electrode 53, and an anode 54, and a vacuum tube section 55 having a cathode 56, a control electrode 57, and an anode 58. Control electrode 53 is connected through resistor 59 and capacitor 60 to amplifier 36, in responsive relation to the signal voltage provided by amplifier 36. Control electrode 57 is connected through resistor 61 and capacitor 62 to amplifier 49, in responsive relation to the signal voltage provided by amplifier 49. Resistors 63 and 64 are connected in circuit with a secondary 65 of a transformer 66 between the anode and cathode of vacuum tube sections 51 and 55, respectively, and are connected in series with each other, as shown. Capacitors 67 and 68 are connected in parallel with resistors 63 and 64, respectively. Resistors 69 and 70 are grid leak resistors for the two vacuum tube sections.

Cathode 56 preferably is connected to ground, as shown. The primary winding 71 of transformer 66 is connected to terminals 15 so that alternating voltage is applied between the anodes and cathodes of vacuum tube sections 51 and 55. This voltage is in phase with the voltage pulses applied across lamp 19 so that the anodes 54 and 58 are positive when pulses of light are produced by lamp 19 and these anodes are negative when pulses of X-rays are produced by tube 1.

When the signal voltages provided by amplifiers 36 and 49 are equal in magnitude during the times when lamp 19 produces pulses of light, equal voltages are applied to control electrodes 53 and 57, and, therefore, vacuum tube sections 51 and 55 conduct equal amounts of current. Magnitudes of the signal voltages during the times that X-ray tube 1 is operative do not affect the operation of vacuum tube sections 51 and 55, because anodes 54 and 58 are negative, and therefore the tubes conduct no current at these times.

The currents conducted by vacuum tube sections 51 and 55 flow through resistors 63 and 64, respectively; and when these currents are equal, capacitors 67 and 68 charge to equal voltages. Resistors 63 and 64 and capacitors 67 and 68 are made sufficiently large to filter out alternating components of the pulses so that the voltages across the resistors are substantially constant direct voltages. This also makes tubes 51 and 55 responsive to peak values of voltages applied to their control electrodes, and substantially eliminates the effects of possible waveform variations.

When the two voltages across resistors 63 and 64 are equal, cathode 52 is at ground potential. When the currents conducted by the two tube sections 51 and 55 are unequal, a potential difference exists across resistors 63 and 64 in series, which has a magnitude and polarity determined by the amount and direction of such inequality. Since unequal conduction through vacuum tube sections 51 and 55 is caused by inequality between the peak signal voltages provided by amplifiers 36 and 49 during the times when light pulses are produced by lamp 19, the potential at cathode 52 is an error signal which represents an inequality in the sensitivities of the two radiation-responsive circuits. This error signal potential is applied through a circuit connection to control electrode 45 of tube 43. This controls the effective resistance of tube 43, and hence the sensitivity of phototube 10 as hereinbefore explained, to minimize the inequality between the sensitivities of the two radiation-responsive circuits. By providing sufficient amplification in amplifiers 36 and 49, inequality between the sensitivities of the two circuits can be held to as small a value as desired.

Assume, for example, that the sensitivity of the circuit comprising phototube 10 and amplifier 49 is greater than that of the circuit comprising phototube 12 and amplifier 36. Since both phototubes receive equal amounts of light from lamp 19, the peak voltage applied to electrode 57 during times when anode 58 is positive exceeds the peak voltage applied to electrode 53 during the same times. This causes tube section 55 to conduct more current than tube section 51 and makes cathode 52 negative. The negative potential of cathode 52 is applied to electrode 45, which increases the effective resistance of tube 43. This increases the voltage drop across tube 43, and thereby decreases the voltage applied across voltage divider 40. The sensitivity of multiplier phototube 10 is greatly dependent upon the voltages applied to its electrodes; a decrease in voltage across voltage divider 40 causes a relatively large decrease in sensitivity of phototube 10. Thus, a balancing action occurs in which the circuit comprising tube 43 responds to error signals provided by phase-selective comparison circuit 50, and acts as an automatic control means for continuously adjusting the relative sensitivities of the two radiation - responsive circuits to substantial equality. Although the sensitivity of the phototube is preferably controlled by adjusting the potentials of all its electrodes, except the anode, as described, sensitivity can be controlled by adjusting the potential of only one electrode, one of the dynodes, for example, or any intermediate number of electrodes.

If the relative sensitivities of the two radiation-responsive circuits subsequently change, because of the changing characteristics of the phototubes, the amplifiers, or other circuit elements, a new error signal appears at cathode 52, and the balancing action which has been described automatically brings the sensitivities back to substantial equality.

Since the two beams of X-rays are produced by a common source, and since the sensitivities of the two radiation-responsive circuits are kept equal, any differences in magnitude of the signal voltages provided by amplifiers 36 and 49 during the times when X-ray tube 1 is operative must be due to an inequality in the X-ray transmission properties of standard 5 and sample 6. To indicate the extent of such inequality, if any, a second phase-selective comparison circuit 72 is provided, which comprises a vacuum tube section 73 having a cathode 74, a control electrode 75, and an anode 76, and a vacuum tube section 77 having a cathode 78, a control electrode 79, and an anode 80. Control electrode 75 is connected through a resistor 81 and a capacitor 82 to amplifier 36, in responsive relation to the signal voltage provided by this amplifier. Control electrode 79 is connected through a resistor 83 and a capacitor 84 to amplifier 49, in responsive relation to the signal voltage provided by this amplifier. Resistors 85 and 86 are connected in circuit with a secondary 65' of transformer 66 between the anodes and cathodes of vacuum tube sections 73 and 77, respectively, and are connected in series with each other, as shown. Capacitors 87 and 88 are connected in parallel with resistors 85 and 86, respectively. Resistors 89 and 90 are grid leak resistors for the two vacuum tube sections. Cathode 74 is preferably connected to ground.

The operation of comparison circuit 72 is the same as that of comparison circuit 50, except that the alternating voltage applied between anode and cathode of vacuum tube sections 73 and 77 is in phase with the voltage applied between the anode and filament of X-ray tube 1, so that comparison circuit 72 responds to differences between the peak signal voltages provided by amplifiers 36 and 49 during times when X-ray tube 1 is operative and X-ray pulses are received by the radiation-responsive circuit. The potential of cathode 78 is therefore an output signal, which is related in magnitude and polarity to the amount and direction of inequality between the X-ray transmission properties of standard 5 and those of sample 6. This output signal may be displayed by indicating means, such as resistor 91 and galvanometer 92 connected in series between cathode 78 and ground, or it can operate recording or remote indicating apparatus, or it can actuate control mechanism to control other machinery for correcting the deviations in thickness or other characteristics detected.

This gauge can be used to monitor any quality which affects the transmission of X-rays by the sample. For example, it can be used as a thickness gauge for steel strip as hereinbefore explained. It can also be used to monitor other characteristics which affect X-ray absorption; for example, the sample may be a predetermined thickness of gasoline containing tetraethyl lead. Since the X-ray absorption of the gasoline depends upon the amount of lead present, the gauge can be used to monitor the percentage of lead in the gasoline.

Refer now to Fig. 2, which shows other apparatus embodying principles of the invention. In this embodiment, radioactive material is used as the source of penetrating radiations. The radioactive material 93 may be enclosed in shielding means 94 having two ports 95 and 96 through which two beams of penetrating radiations are transmitted toward radiation detectors 97 and 98, which may be ionization chambers. One such beam passes through the sample 99, and the other such beam passes through standard 100, which may be an adjustable wedge. The beams are periodically interrupted by a shutter comprising two disks 101 and 102, mounted on a shaft 103 which is rotated by a synchronous electric motor 104. Motor 104 is operated by alternating current from terminals 105, which may be connected to a suitable source of alternating electric power, such as a 60-cycle commercial outlet.

Refer now to Fig. 3, which is a plan view of shutter disk 101. Disk 102 is identical with the disk shown. The disks are preferably made of a relatively thick material, and have holes 106 equally spaced around the disk at equal radial distances from shaft 103. As the disk rotates, the penetrating radiations are alternately interrupted by the disk and transmitted through holes 106 to the radiation detectors. Thus, the radiations reach the detectors as periodic pulses. Other holes 107 are provided at a different radial distance from shaft 103, for purposes hereinafter explained. When an eight-pole synchronous electric motor is used at 104, disks 101 and 102 each have four holes 106 and four holes 107, as shown, to transmit one pulse of the radiations from source 93 and one pulse of the calibration radiations during each cycle of alternating voltage applied to terminals 105.

Again referring to Fig. 2, other or calibration radiations are provided by radioactive materials 108 and 109 respectively contained in shielding means 110 and 111 having ports 112 and 113 for transmitting such calibration radiations to detectors 97 and 98, respectively. The calibration radiations do not pass through sample 99 or standard 100, but do pass through holes 107 in disks 101 and 102 of the shutter. Since holes 107 are angularly spaced between holes 106, as shown in Fig. 3, the calibration radiations arrive at the detectors as pulses occurring in time between the pulses of penetrating radiations from radioactive material 93. An adjustable wedge 114 may be placed in front of port 112 or port 113, or wedges may be placed in front of both ports if desired, to permit an adjustment to equalize the amounts of such calibration radiations which are received by the two detectors 97 and 98.

Pulses of radiations received by detectors 97 and 98 cause voltage pulses across load resistors 115 and 116, respectively. These voltage pulses are amplified by vacuum tube amplifiers 117 and 118 to provide signal voltages similar to the signal voltages provided by amplifiers 49 and 36 in the Fig. 1 circuit. A conventional D.-C. power supply 119, having a negative terminal 120, a ground terminal 121, and a positive terminal 122, provides direct voltages for operating the ionization chambers and the amplifiers.

The signal voltages provided by amplifiers 117 and 118 during times when the radiation detectors 97 and 98 receive pulses of the calibration radiations from sources 108 and 109, are compared by a phase-selective comparison circuit 123 which is similar to comparison circuit 50 in the Fig. 1 circuit, and hence will not be described again. The error signal voltage provided by comparison circuit 123 is used to adjust the relative sensitivities of the radiation-responsive circuits by adjusting the gain of amplifier 117. This is accomplished by control means, comprising connection 124 and resistor 125, for varying the grid bias of amplifier 117 in response to changes in the error signal voltage provided by comparison circuit 123. A variable gain tube is used in this amplifier so that such variations in grid bias change the amplifier gain.

A second comparison circuit 126 is connected to compare the signal voltages produced by amplifiers 117 and 118 during times when the pulses of penetrating radiations from source 93 are received by radiation detectors 97 and 98. Operation of this circuit is the same as the operation of comparison circuit 72, Fig. 1. The anode to cathode voltages for the two comparison circuits are obtained from secondary windings of a transformer 127, which has its primary winding connected to terminals 105. Synchronism is maintained between the comparison circuits and the radiation pulses by the fact that transformer 127 and synchronous motor 104 are energized from the same alternating current source.

Instead of using the output signal from circuit 126 directly to indicate deviations from standard thickness, the output signal voltage can be made to operate a conventional positioning control 128 to adjust the position of a wedge 129 located in one beam of the penetrating radiations. Wedge 129 is shown in the beam which passes through sample 99, but it may alternatively be located in the beam which passes through standard 100. Preferably, wedge 129 is initially adjusted so that a point of medium or average wedge thickness is located in the beam, and wedge 100 is adjusted so that the difference in thickness between the two wedges produces the same amount of radiation absorption as the desired thickness or property of the sample to be monitored. If the sample varies from this desired thickness or quality in a way which changes the amount of radiation which it absorbs, an output voltage is provided by comparison circuit 126 which operates positioning control 128 to change the position of wedge 129, until the amounts of radiations reaching detectors 97 and 98 are again equal. The changes in position of wedge 129 then indicate deviations from desired thickness of the sample. An indicator dial 130, also operated by positioning control 128, may be provided to indicate these changes.

Having described the principles of this invention and the best mode in which I have contemplated applying those principles, I wish it to be understood that the examples described are illustrative only, and that other means and modifications can be used without departing from the true scope of the invention.

What I claim as new and desire to secure by Letters Patent of the United States is:

1. A gauge of the type in which two beams of penetrating radiations are directed through a standard and through a sample to be examined, respectively, comprising a common source for such two beams of penetrating radiations, a first radiation-responsive circuit including a radiation detector positioned to receive unabsorbed radiations from one of such beams after it passes through the sample, a second radiation-responsive circuit including a radiation detector positioned to receive unabsorbed radiations from the other of such beams after it passes through the standard, said radiation-responsive circuits being of a type which provides electric signals related in magnitude to the radiation incident upon the detector, means for periodically interrupting such beams so that the penetrating radiations reach said detectors as periodic pulses, means for producing and transmitting to said detectors periodic pulses of calibration radiations, such pulses of calibration radiations occurring in time between said pulses of penetrating radiations, a first phase-selective comparison circuit connected to compare the electric signals provided by said first and second radiation-responsive circuits during the pulses of such calibration radiations and to provide an error signal related to differences between the signals so compared, automatic control means connected in responsive relation to such error signal to adjust the relative sensitivities of said radiation-responsive circuits to minimize such differences, and a second phase-selective comparison circuit connected to compare the electric signals provided by said first and second radiation-responsive circuits during said pulses of penetrating radiations and to provide an output signal related to differences between the signals so compared.

2. A thickness gauge of the type in which two beams of penetrating radiations are directed through a standard of known thickness and through a sample to be measured, respectively, comprising a common source for such two beams of penetrating radiations, a first radiation-responsive circuit including a radiation detector positioned to receive unabsorbed radiations from one of such beams after it passes through the sample, a second radiation-responsive circuit including a radiation detector positioned to receive unabsorbed radiations from the other of such beams after it passes through the standard, said radiation-responsive circuits being of a type which provides a signal voltage related in magnitude to the radiation incident upon the detector, means for periodically interrupting such beams so that the penetrating radiations reach said detectors as periodic pulses, means for producing and transmitting to said detectors periodic pulses of calibration radiations, such pulses of calibration radiations occurring in time between said pulses of penetrating radiations, a first phase-selective comparison circuit comprising first and second vacuum tube sections each having a cathode, a control electrode, and an anode, the control electrodes of said first and second vacuum tube sections being connected to said first and second radiation-responsive circuits respectively in responsive relation to the signal voltages provided by such circuits, first and second resistors connected in circuit between anode and cathode of said first and second vacuum tube sections respectively and connected in series with each other, capacitors connected in parallel with said first and second resistors respectively, and means to apply alternating voltages between anode and cathode of said first and second vacuum tube sections in phase with the pulses of calibration radiations, whereby an error signal direct voltage is provided across said series-connected first and second resistors which is related in magnitude to differences between the signal voltages provided by said first and second radiation-responsive circuits during the pulses of such calibration radiations, automatic control means connected in responsive relation to such error signal voltage to adjust the sensitivity of one of said radiation-responsive circuits relative to the sensitivity of the other to minimize such differences, and a second phase-selective comparison circuit comprising third and fourth vacuum tube sections each having a cathode, a control electrode, and an anode, the control electrodes of said third and fourth vacuum tube sections being connected to said first and second radiation-responsive circuits respectively in responsive relation to the signal voltages provided by such circuits, third and fourth resistors connected in circuit between anode and cathode of said third and fourth vacuum tube sections respectively and connected in series with each other, capacitors connected in parallel with said third and fourth resistors respectively, and means to apply alternating voltages between anode and cathode of said third and fourth vacuum tube sections in phase with said pulses of penetrating radiations, whereby an output signal direct voltage is provided across said series-connected third and fourth resistors which is related in magnitude to differences between the signal voltages provided by said first and second radiation-responsive circuits during said pulses of penetrating radiations.

3. A gauge of the type in which two beams of X-rays are directed through a standard and through a sample to be examined respectively, comprising a two-beam X-ray tube as a common source for such two beams of X-rays, a first X-ray responsive circuit including an X-ray detector positioned to receive unabsorbed X-rays from one of such beams after it passes through the sample, a second X-ray responsive circuit including an X-ray detector positioned to receive unabsorbed X-rays from the other of such beams after it passes through the standard, said X-ray responsive circuits being of a type which provides electric signals related in magnitude to the X-rays incident upon the detector, connections for applying alternating voltage to said X-ray tube, so that the X-ray tube is operative during alternate half-cycles only of such alternating voltage and the X-rays are produced as periodic pulses, means for producing and transmitting to said detectors periodic pulses of calibration radiations, such pulses of calibration radiations occurring in time between the pulses of X-rays, a first phase-selective comparison circuit connected to compare the electric signals provided by said first and second X-ray responsive circuits during the pulses of calibration radiations and to provide an error signal related to differences between the signals so compared, automatic control means connected in responsive relation to such error signal to adjust the relative sensitivities of said X-ray responsive circuits to minimize such differences, and a second phase-selective comparison circuit connected to compare the electric signals provided by said first and second X-ray responsive circuits during such X-ray pulses and to provide an output signal related to differences between the signals so compared.

4. A gauge of the type in which two beams of penetrating radiations are directed through a standard and through a sample to be examined, respectively, comprising a common source for such two beams of penetrating radiations, a first radiation-responsive circuit including a first fluorescent element positioned to receive unabsorbed radiations from one of such beams after it passes through the sample, whereupon such fluorescent element emits light, a first phototube positioned to receive light so emitted by said first fluorescent element, and circuit means to apply operating voltage to the first phototube and to provide an electric signal related in magnitude to the light incident upon said first phototube, a second radiation-responsive circuit including a second fluorescent element positioned to receive unabsorbed radiations from the other of such beams after it passes through the standard, whereupon such fluorescent element emits light, a second phototube positioned to receive light so emitted by said second fluorescent element, and circuit means to apply operating voltage to the second phototube and to provide an electric signal related in magnitude to the light incident upon said second phototube, means for periodically interrupting such beams so that the penetrating radiations reach said fluorescent elements as periodic pulses, means for producing and transmitting to said phototubes periodic pulses of calibration light, such pulses of calibration light occurring in time between said pulses of penetrating radiations, a first phase-selective comparison circuit connected to compare the electric signals provided by said first and second radiation-responsive circuits during the pulses of such calibration light and to provide an error signal related to differences between the signals so compared, automatic control means connected in responsive relation to such error signal to adjust the relative magnitudes of operating voltage applied to said first and second phototubes and thereby to adjust the relative sensitivities of said first and second radiation-responsive circuits to minimize such differences, and a second phase-selective comparison circuit connected to compare the electric signals provided by said first and second radiation-responsive circuits during said pulses of penetrating radiations and to provide an output signal related to differences between the signals so compared.

5. A thickness gauge of the type in which two beams of X-rays are directed through a standard of known thickness and through a sample to be measured, respectively, comprising a two-beam X-ray tube as a common source for such two beams of X-rays, a first X-ray responsive circuit including a first fluorescent element positioned to receive unabsorbed X-rays from one of such beams after it passes through the sample, whereupon such fluorescent element emits light, a first phototube of the multiplier type positioned to receive light so emitted by said first fluorescent element, and circuit means to apply operating voltage to the first phototube and to provide a signal voltage related in magnitude to the light incident upon said first phototube, a second X-ray responsive circuit including a second fluorescent element positioned to receive unabsorbed X-rays from the other of such beams after it passes through the standard, whereupon such fluorescent element emits light, a second phototube of the multiplier type positioned to receive light so emitted by said second fluorescent element, and circuit means to apply operating voltage to the second phototube and to provide a signal voltage related in magnitude to the light incident upon said second phototube, connections for applying alternating voltage to said X-ray tube, so that the X-ray tube is operative during alternate half-cycles only of such alternating voltage and the X-rays are produced as periodic pulses, an electric discharge lamp, means for applying current pulses to said lamp during the half-cycles when said X-ray tube is not operative, whereby the lamp produces periodic pulses of light which occur in time between the pulses of X-rays, light-conducting tubes for transmitting pulses of light produced by said lamp to each of said phototubes, a first phase-selective comparison circuit comprising first and second vacuum tube sections each having a cathode, a control electrode, and an anode, the control electrodes of said first and second vacuum tube sections being connected to said first and second X-ray responsive circuits respectively in responsive relation to the signal voltages provided by such circuits, first and second resistors connected in circuit between anode and cathode of said first and second vacuum tube sections respectively and connected in series with each other, capacitors connected in parallel with said first and second resistors respectively, and means to apply alternating voltages between anode and cathode of said first and second vacuum tube sections in phase with the current pulses applied to said lamp, whereby an error signal direct voltage is provided across said series-connected first and second resistors which is related in magnitude to differences between the signal voltages provided by said first and second X-ray responsive circuits during the pulses of light produced by said lamp, automatic control means connected in responsive relation to such error signal voltage to adjust the relative magnitudes of operating voltage applied to said first and second phototubes and thereby to adjust the relative sensitivities of said first and second X-ray responsive circuits to minimize such differences, and a second phase-selective comparison circuit comprising third and fourth vacuum tube sections each having a cathode, a control electrode, and an anode, the control electrodes of said third and fourth vacuum tube sections being connected to said first and second X-ray responsive circuits respectively in responsive relation to the signal voltages provided by such circuits, third and fourth resistors connected in circuit between anode and cathode of said third and fourth vacuum tube sections respectively and connected in series with each other, capacitors connected in parallel with said third and fourth resistors respectively, and means to apply alternating voltages between anode and cathode of said third and fourth vacuum tube sections in phase with the operation of said X-ray tube, whereby an output signal direct voltage is provided across said series-connected third and fourth resistors which is related in magnitude to differences between the signal voltages provided by said first and second radiation-responsive circuits during such X-ray pulses.

6. A gauge of the type in which two beams of penetrating radiations are directed through a standard and through a sample to be examined respectively, comprising a radioactive source for such two beams of penetrating radiations, a first radiation-responsive circuit including a radiation detector positioned to receive unabsorbed radiations from one of such beams after it passes through the sample, a second radiation-responsive circuit including a radiation detector positioned to receive unabsorbed radiations from the other of such beams after it passes through the standard, said radiation-responsive circuits being of a type which provides electric signals related in magnitude to the radiation incident upon the detector, a shutter for periodically interrupting such beams so that the penetrating radiations reach said detectors as periodic pulses, means for producing and transmitting to said detectors periodic pulses of calibration radiations, such pulses of calibration radiations occurring in time between said pulses of penetrating radiations, a first phase-selective comparison circuit connected to compare the electric signals provided by said first and second radiation-responsive circuits during the pulses of calibration radiations and to provide an error signal related to differences between the signals so compared, automatic control means connected in responsive relation to such error signal to adjust the relative sensitivities of said radiation-responsive circuits to minimize such differences, and a second phase-selective comparison circuit connected to compare the electric signals provided by said first and second radiation-responsive circuits during said pulses of penetrating radiations and to provide an output signal related to differences between the signals so compared.

7. A thickness gauge of the type in which two beams of penetrating radiations are directed through a standard of known thickness and through a sample to be measured respectively, comprising a common radioactive source for such two beams of penetrating radiations, a first radiation-responsive circuit including a first radiation detector positioned to receive unabsorbed radiations from one of such beams after it passes through the sample, such detector being of a type which provides a voltage related in magnitude to the radiation received and a vacuum tube amplifier connected to amplify the voltage provided by said first detector to provide a first signal voltage, a second radiation-responsive circuit including a second radiation detector positioned to receive unabsorbed radiations from the other of such beams after it passes through the sample, such detector being of a type which provides a voltage related in magnitude to the radiation received, and a vacuum tube amplifier connected to amplify the voltage provided by said second detector to provide a second signal voltage, a shutter for periodically interrupting such beams so that the penetrating radiations reach said detectors as periodic pulses, radioactive means for producing and transmitting calibration radiations to said detectors, such transmission of calibration radiations being interrupted by said shutter except during a portion of the time when the beams of penetrating radiations are interrupted, so that such calibration radiations reach said detectors as periodic pulses occurring in time between said pulses of penetrating radiations, a first phase-selective comparison circuit comprising first and second vacuum tube sections each having a cathode, a control electrode, and an anode, the control electrodes of said first and second vacuum tube sections being connected to said first and second radiation-responsive circuits respectively in responsive relation to the first and second signal voltages, first and second resistors connected in circuit between anode and cathode of said first and second vacuum tube sections respectively and connected in series with each other, capacitors connected in parallel with said first and second resistors respectively, and means to apply alternating voltages between anode and cathode of said first and second vacuum tube sections in phase with the pulses of calibration radiations, whereby an error signal direct voltage is provided across said series-connected first and second resistors which is related in magnitude to differences between the first and second signal voltages during the pulses of calibration radiations, automatic control means comprising connections for adjusting the bias of one of said amplifiers responsive to such error signal voltage to adjust the relative gain of said amplifiers and thereby to adjust the relative sensitivities of said first and second radiation-responsive circuits to minimize such differences, and a second phase-selective comparison circuit comprising third and fourth vacuum tube sections each having a cathode, a control electrode and an anode, the control electrodes of said third and fourth vacuum tube sections being connected to said first and second radiation-responsive circuits respectively in responsive relation to the first and second signal voltages, third and fourth resistors connected in circuit between anode and cathode of said third and fourth vacuum tube sections respectively and connected in series with each other, capacitors connected in parallel with said third and fourth resistors respectively, and means to apply alternating voltages between anode and cathode of said third and fourth vacuum tube sections in phase with said pulses of penetrating radiations, whereby an output signal direct voltage is provided across said series-connected third and fourth resistors which is related in magnitude to differences between the signal voltages provided by said first and second radiation-responsive circuits during said pulses of penetrating radiations.

RAYMOND V. POHL.

REFERENCES CITED

The following references are of record in the file of this patent:

UNITED STATES PATENTS

| Number | Name | Date |
|---|---|---|
| 2,467,812 | Clapp | Apr. 19, 1949 |
| 2,488,269 | Clapp | Nov. 15, 1949 |

OTHER REFERENCES

X-ray Inspection with Phosphorus and Photoelectric Tubes, by H. M. Smith, G. E. Review, March 1945, pp. 13–17.